United States Patent Office 2,735,820
Patented Feb. 21, 1956

2,735,820
CALCIUM-LITHIUM HYDRIDE AND PROCESS OF MAKING IT

Leonard W. Steiger, Hackensack, N. J., assignor to Maywood Chemical Works, Maywood, N. J., a corporation of New Jersey No Drawing. Application February 8, 1955, Serial No. 486,996

5 Claims. (Cl. 252—182)

The present invention relates to calcium-lithium hydride and process of making it, and more particularly to a mixture of the hydrides of calcium and lithium, which contains from about 1% to about 50% lithium hydride and is relatively pure in that it contains not over about 3% of calcium plus lithium in their elemental forms. The mixture is in the form of a solid solution of the two hydrides. The present invention also relates to the process of making such a product.

There are many parts of the world where bottled hydrogen gas is not readily available and where it would be inconvenient, expensive and sometimes substantially prohibitive to carry such hydrogen gas by any available means of transportation. In some such places, including inaccessible points reached occassionally by parties on foot and also in lifeboats at sea, it is sometimes not only desirable, but almost essential, that balloons be inflated with hydrogen for use as meteorological balloons or for use as signals of the location of the persons in charge thereof or for holding substantially erect a wire which can be used as an antenna wire for sending out distress signals. Apparatus for such purposes is disclosed, for example, in the patent to Steiger, the present applicant, No. 2,392,199, granted January 1, 1946. Under any of these circumstances it is desirable that an easily carried material capable of generating hydrogen be available. The present invention provides such a material and a practical and efficient commercial process of making it.

The material of the present invention is capable of reacting with water, which is readily available almost everywhere, so as to generate hydrogen. This reaction occurs even when the water is relatively impure, such as sea water. The present invention does not include the equipment involving the generator or with the use per se of the hydrogen once it is generated, but is restricted to the material which, when brought into contact with water, will generate hydrogen.

In view of the use to which material of the present invention may have to be put as aforesaid, it is considered essential that it be relatively trouble free and also that it be capable of generating a maximum amount of hydrogen per unit of weight of the material itself. It is in satisfying these two requirements that the present product excels products heretofore available.

It is known that lithium hydride is capable per se of fulfilling the two requirements above noted. This material is, however, quite costly. It is desired, therefore, that a relatively cheaper material be available which will also fulfill the requirements in question. Tests have been made of calcium hydride. These tests have brought out several substantial difficulties. First, in the making of calcium hydride, in accordance with known processes, elemental calcium in lump form is brought into contact with hydrogen while in a closed reaction zone wherein it can only come into contact with hydrogen and not with other gases which might interfere with the desired hydrogenation reaction. The solid material is brought up to about 400° C., which is necessary for the initiation of the desired reaction. It is found, however, that the reaction will proceed only to a certain extent, resulting in the conversion of the surface portion only of the lumps into calcium hydride, which thereupon forms a shield or blocking layer, preventing access of the hydrogen with the unreacted core portions of the lumps or particles. Thus, the final product contains a substantial amount of unreacted elemental calcium, the amount being dependent upon the particle size of the material subjected to hydrogenation. This in practice means that when the product thus made reacts with water, the reaction of the calcium hydride with water in accordance with the equation $CaH_2 + 2H_2O = Ca(OH)_2 + 2H_2$ will yield two mols of hydrogen for each molecular weight of calcium hydride. On the other hand, the reaction of elemental calcium with water according to the equation $Ca + 2H_2O = Ca(OH)_2 + H_2$ gives only one mol of hydrogen per mol of calcium. This is obviously less efficient as to hydrogen production for an almost equal weight of the starting material. As a result, the presently available commercial product, which in practice contains at least about 5% and perhaps more, elemental calcium, will yield substantially less than the theoretical maximum amount of hydrogen, which it could produce if all of the calcium were initially in hydride form. Thus, there is a very real commercial demand for a product giving a maximum of hydrogen per unit weight of the starting solid material, in other words, with a minimum of the calcium (or lithium) in elemental form. Prior art commercial processes of hydrogenation of calcium have not been effective to convert more than about 95% of the calcium to calcium hydride.

From another point of view, even when calcium hydride is made under very carefully controlled laboratory conditions so as to be relatively pure (which operation can only be conducted on a very small laboratory scale at best), the calcium hydride so produced is still not capable of providing a reasonably uniform evolution of hydrogen upon reaction with water. This appears to be due to the fact that the reaction between calcium hydride and water seems to proceed at different rates, depending to a large extent upon particle size, so that very small particles, for example, react so fast that the evolution of hydrogen occurs with almost explosive violence. This in practice, in connection with the use of many common types of balloon-inflating apparatus, results in the loss of a substantial part of the hydrogen generated. What is desired practically is a material which will evolve hydrogen at a relatively constant and usable rate, rather than some very fast, almost explosive and certainly unpredictable rate. Even when the calcium hydride is in relatively large lumps, it is found that the material is sufficiently irregular (i. e. some of the material has been converted almost completely to calcium hydride, while other portions include varying amounts of elemental calcium), so that the evolution of gas therefrom is largely unpredictable and not smooth as is desired.

It is found in accordance with the present invention, however, that if, instead of attempting to use relatively pure calcium hydride, a mixture of calcium and lithium hydrides in the form of a solid solution be used, then the evolution of gas is quite smooth and reasonably predictable using all proportions of mixtures at from about 1% to over 50% lithium hydride with the balance in each instance calcium hydride and with not more than 3% total elemental lithium plus calcium. Such a material is provided by the present invention. It has further been found, in accordance with the present invention, that if lithium and calcium are first formed into an alloy by methods known to the prior art and the alloy of these two elemental materials then subjected to a hydrogenation reaction, the desired product will be formed; and further that the presence of lithium and/or lithium hydride seems to have a catalytic effect upon the hydrogenation of the calcium, so that substantially complete conversion of the calcium to its hydride results; and that the final product will be in the form of a solution, each in the other, of lithium and calcium hydrides, which after cooling, will be a solid solution. This process of producing the material of the present invention represents another phase thereof.

Turning now to the details of the process of the present invention, the starting material is an alloy of lithium and calcium having the proportions which these metals in their hydride forms are desired to have in the final product. Such an alloy may be made by any methods known to the art, one such method being set forth in the patent to Osborg No. 1,869,493, granted August 2, 1932, and others being mentioned generally in the introduction to that patent. In any event, the manner in which the alloy of lithium and calcium is prepared per se forms no part of the present invention, this invention starting with the prepared alloy as a starting material.

Such an alloy is placed in a substantially closed reaction zone which may, for example, be an autoclave or similar apparatus capable of being closed and sealed tightly from ingress of atmospheric air, while provision is made for introducing into this reaction zone hydrogen gas which is to react with the elemental materials (i. e. the alloy aforesaid). Provision should also be made for heating the elemental materials in the reaction zone to an initial temperature at which it is desired to start the reaction.

In starting the reaction, the elemental materials in their alloy form as aforesaid are placed in a suitable vessel forming a reaction zone and the vessel closed. Any air in the closed vessel is then purged therefrom, for example, by flowing hydrogen therethrough; and the completion of the purging ascertained by testing the effluent gas, so as to assure that it is substantially solely hydrogen. It is possible, of course, for some other gas to be present with the hydrogen, but few other gases can be present without interfering with the purity of the final product, such gases as argon and helium being permissible but most other gases being objectionable and undesirable. The material in the reaction zone is then brought up to the desired starting temperature, which is about 400° C., by the application of heat from any available source, for example, by externally applied heat from combustion of a suitable fuel or by electric resistance heating means. The particular manner of application of heat is relatively immaterial from the point of view of the present invention.

Once the reaction is started by the supplying of hydrogen into contact with the heated calcium and lithium in the form of an alloy of these two materials, the reaction is exothermic to some extent as to both elements, so that further heating is unnecessary and in fact some cooling may, under some circumstances, be desirable. Usually, however, the evolution of heat of the reaction merely serves to raise the temperature of the reacting materials to some extent and to fuse the products of the reaction so that the fused hydrides run down to the bottom of the reaction vessel; and, of course, some heat is lost to the surroundings through the wall of the reaction vessel. The temperature in the reaction zone may rise substantially during the reaction, this being not objectionable, but in some respects being desirable in that higher temperatures shorten the reaction time. Hydrogen gas is supplied to the inside of the reaction vessel substantially continuously and so as to attempt to maintain a predetermined desired pressure of hydrogen within the reaction vessel. It has been found, for example, that a 5 pound gauge pressure is a good pressure to work toward. It will be understood, however, that as hydrogen is continually used up for reaction with the elemental calcium and lithium within the reaction vessel or within the reaction zone, that hydrogen must be substantially continuously supplied in order that the pressure thereof shall not fall too low.

Again, while it is possible that the reaction could occur at or below atmospheric pressure, it is desirable that a certain amount of superatmospheric or gauge pressure be maintained within the reaction zone. This has two desirable effects: first, in the event that any leaks occur in the reaction vessel, the establishment of superatmospheric pressure within will assure that the leaks are from the inside to the outside, where the hydrogen may be burned or dissipated; while leakage of air from the outside to the inside would result in premature and undesired oxidation of the contents of the reaction zone, which would be in effect fatal to the quality of the reacting materials or the product of the reaction, or both. A second reason for desiring superatmospheric pressure is that an increase in hydrogen pressure in the reaction zone tends to cause the reaction to proceed in a desired direction toward completion.

While the prior art has found as aforesaid that the hydrogenation reaction of calcium alone will not proceed to substantially 100% completion, due to the shielding or blocking action above described, it is found that the presence of as little as about 1% lithium in admixture with the calcium as aforesaid will cause the hydrogenation reaction to proceed smoothly and to substantial completion. The reasons for this are not completely understood. It seems probable that the hydrogenation reaction of calcium may be catalyzed in some way by the presence of lithium and/or lithium hydride. Another possible explanation is that the mixed calcium and lithium hydrides, which when molten, at the reaction temperatures at which they are formed, are completely miscible each with the other, have a lower melting point than calcium hydride, for example, so that the mixed materials will run off from the unreacted elemental calcium and lithium, leaving the surfaces of the unreacted elemental materials free and available for reaction with more hydrogen. However, whatever be the true explanation, it is a valuable discovery and a part of the present invention that the conjoint hydrogenation of the alloy of lithium and calcium proceeds to substantially 100% complete hydrogenation as to both elements, so that the product, when cooled, becomes a solid solution of the hydrides of these elements having a minimum of either calcium or lithium in their elemental forms. As a practical matter, the total of calcium and lithium in elemental form is never more than 3% and may be substantially less.

While alloys of calcium and lithium having as little as 1% of lithium have been found effective to give a substantially completely hydrogenated product as aforesaid, it is usually desirable in the commercial practice of the present invention to use about 5% lithium in the starting alloy material as this proportion lends itself adequately to relatively large scale commercial operation and is not much more expensive than is an alloy having a lower percentage of lithium, it being recognized, of course, that lithium is much more expensive than is calcium. It is found, for example, in the making of the starting alloy per se, on a commercial scale, difficulties are sometimes encountered when percentages of lithium substantially less than about 5% are used. Such difficulties do not correspondingly present themselves when operating on a smaller scale, for example, on a laboratory basis.

The operation of hydrogenation may proceed as aforesaid until it is completed, which is evidenced by the hydrogen pressure being maintained at a desired point, for example, 5 pounds gauge, without the further introduction of additional hydrogen, showing that as much hydrogen has been used up in the hydrogenation reaction as the materials present in the reaction zone will take. When this occurs, the materials in the reaction zone may be cooled; and thereafter the vessel opened and the solidified product material broken up into particles or lumps of the desired size or sizes. The material produced in this way is a solid solution of the hydrides of lithium and calcium, containing lithium in the proportions desired and which are determined by the preparation of the alloy from which the hydrides are prepared. The product so prepared has a total of not over 3% of elemental calcium plus lithium. This product is also a part of the present invention.

The invention will be further appreciated from examples which follow:

Example I

About 20 lbs. of lithium-calcium alloy ingots, each consisting of about 5% commercial grade lithium and about 95% commercial grade calcium, were placed in a reaction pot. These ingots were each about 6" x 2" x 3" in size. The pot was closed and purged to assure an absence of air. The pot was then heated by an external gas flame to heat the contents thereof to about 400° C. When the contents of the pot had been brought up to temperature, hydrogen was admitted, whereupon heating was cut off as the heat of the reaction not only maintained the temperature of the reaction mass in the pot, but also caused it to rise up to about 900° C. Hydrogen was continuously supplied to maintain a gauge pressure within the pot of about 5 lbs. The reaction continued for about six hours, following which continued supply of hydrogen was cut off and the pot allowed to cool to permit the final product to freeze therein. This product was broken up into lumps about 1 inch and smaller. The final product was found to contain 0.5% lithium and about 1.5% calcium, each in their elemental forms, with the balance lithium and calcium hydrides, with the exception of the impurities normally present in commercial grade lithium and calcium respectively.

Example II

In this example the same procedure was followed except that the starting material consisted essentially of about 1% commercial lithium and 99% commercial calcium. Under these circumstances special precautions had to be taken to assure proper results, the chief of which was that the temperature could not be allowed to rise over about 500° C. and had to be maintained at least about 400° C. in order to assure continuance of the hydrogenation reaction. This result was attained by varying the procedure given in Example I by supplying hydrogen for the first four hours of the reaction at only about 1 lb. gauge, following which the hydrogen pressure was raised to about 5 lbs. gauge. The reaction was completed in about 12 hours. The product in this instance was a fused mass somewhat less crystalline in character than that of Example I. The total elemental calcium and lithium was about the same as that set forth in Example I.

Example III

In this example the alloy used as starting material consisted essentially of 25% commercial lithium and 75% commercial calcium. The procedure was the same as in Example I, except that the temperature rose in this instance to about 1000° C.–1100° C. and the reaction time was only about 5 hours. The product had an even more distinctly crystalline structure than in the case of Example I. The quality of the final product as measured by the total unreacted elemental calcium plus lithium was about the same as in Example I when the process was operated by the average factory workers; but it was found that the amount of unreacted material remaining could be substantially reduced when particular care was taken in the conduct of the process aforesaid. This care in most instances takes the form of assuring a completion of the reaction by holding the reaction mass at a temperature at or above 400° C. and in the presence of hydrogen for a period of time sufficient to assure substantial completion of the reaction.

Example IV

In this case the lithium-calcium alloy treated consisted essentially of 50% commercial lithium and 50% commercial calcium. The procedure used was exactly as given in Example I, except that in this case the temperature rose to about 1200° C. during the reaction and the reaction was completed in about 3 hours. The product was a crystalline mass essentially the same in character as that resulting from Example III. The purity of the product was about as stated in connection with Example III.

While there has been disclosed herein a principal commercial process of producing a product, both in accordance with the present invention, equivalents of various phases of the disclosure hereinabove set forth will suggest themselves from the foregoing to those skilled in the art. It is intended that the scope of this invention, as to both product and process, shall be measured by the appended claims, which are to be construed validly as broadly as the state of the prior art permits.

What is claimed is:

1. A mixture of the hydrides of calcium and lithium, containing from about 1% to about 50% lithium hydride and containing not over 3% of calcium plus lithium in elemental form, said mixture being in the form of a solid solution of said hydrides.

2. A mixture of the hydrides of calcium and lithium, containing about 5% lithium hydride and containing not over 3% of calcium plus lithium in elemental form, said mixture being in the form of a solid solution of said hydrides.

3. The process of making a solid solution of the hydrides of calcium and lithium in which there is from about 1% to about 50% by weight of lithium hydride and which contains not over 3% elemental calcium plus elemental lithium, comprising providing in a closed reaction zone an alloy of elemental calcium and elemental lithium in the proportions in which these elements exist in the mixture of hydrides to be made, bringing the temperature of the alloy in said zone to about 400° C. for the initiation of the desired hydrogenation reaction, supplying hydrogen gas into said zone for reaction with the elemental calcium and lithium therein in a manner such as to establish and maintain substantially a predetermined pressure of hydrogen in said zone and until no more hydrogen is taken up by the reaction mass in said zone, and removing the hydrides of lithium and calcium from said zone after the reaction is completed and after the reaction products have cooled.

4. The process according to claim 3, in which the hydrogen is supplied substantially continuously to said zone until the reaction therein is completed as evidenced by the pressure of hydrogen in said zone remaining substantially constant at a predetermined value without further addition of hydrogen.

5. The process according to claim 3, in which the hydrogen is supplied to said zone as long as the gaseous pressure of hydrogen in said zone is below a predetermined pressure of about 5 pounds (gauge).

References Cited in the file of this patent

UNITED STATES PATENTS

| 857,146 | Askenasy et al. | June 18, 1907 |
| 1,869,493 | Osberg | Aug. 2, 1932 |
| 2,372,670 | Hansley | Apr. 3, 1945 |
| 2,425,711 | Alexander | Aug. 19, 1947 |
| 2,702,281 | Gibb | Feb. 15, 1955 |

OTHER REFERENCES

Halls: Industrial Chemist, vol. 22, pp. 680–685 (1946).
Finholt et al.: J. Amer. Chem. Soc., May 1947, pp. 1199–1203.